US006850624B1

(12) United States Patent
Shinoda et al.

(10) Patent No.: US 6,850,624 B1
(45) Date of Patent: Feb. 1, 2005

(54) DATA EMBEDDING APPARATUS, DATA EXTRACTING APPARATUS, AND METHOD THEREFOR, AND RECORDING MEDIUM HAVING SUCH METHODS RECORDED THEREON

(75) Inventors: Takashi Shinoda, Nagareyama (JP); Nobuharu Miura, Ichikawa (JP); Yoh Miyamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/517,514

(22) Filed: Mar. 2, 2000

(30) Foreign Application Priority Data

Nov. 29, 1999 (JP) ............................................ 11-337916

(51) Int. Cl.[7] ................................................ G06K 9/00
(52) U.S. Cl. ...................... 382/100; 382/166; 358/3.28; 380/201
(58) Field of Search .............................. 382/100, 235, 382/248, 276, 167, 166, 240, 162, 232, 165, 168, 233, 274; 422/109, 110; 358/1.15, 1.9, 3.28; 345/788, 427; 380/200, 201, 243, 269; 348/254, 393.1, 717

(56) References Cited

U.S. PATENT DOCUMENTS

| | | | | |
|---|---|---|---|---|
| 5,142,272 A | * | 8/1992 | Kondo ........................ | 340/701 |
| 5,659,726 A | * | 8/1997 | Sandford, II et al. ....... | 395/612 |
| 5,946,414 A | * | 8/1999 | Cass et al. .................. | 382/183 |
| 6,055,321 A | * | 4/2000 | Numao et al. .............. | 382/100 |
| 6,334,187 B1 | * | 12/2001 | Kadono ...................... | 713/176 |

FOREIGN PATENT DOCUMENTS

| | | |
|---|---|---|
| EP | 0 612 054 | 8/1994 |
| GB | 2-326556 | 12/1998 |
| WO | 96-26494 | 8/1996 |

OTHER PUBLICATIONS

Kobayashi et al., "Data Hiding Using the Nature of Neighboring Pixels—Statistical Nature of Neighboring Pixels", Transactions of 56th National Meeting of Institute of Information Processing, pp. 3–37—23–38, 1998.

* cited by examiner

*Primary Examiner*—Bhavesh M. Mehta
*Assistant Examiner*—Seyed Azarian
(74) *Attorney, Agent, or Firm*—Mattingly, Stanger & Malur, P.C.

(57) ABSTRACT

An intended image data structure is assumed to have a color information storing region and a pixel information storing region as its components. First, consider that the color information storing region within the image data structure is divided into a plurality of subregions, and a corresponding bit value is defined for each of the subregions. Next, an index number stored for each of pixels within the pixel information storing region is changed to an index number belonging to a subregion corresponding to a bit value of information to be embedded. In this way, one bit or more of information can be embedded for each pixel. Thus, a large amount of information can be embedded into a small-size image composed of simple shapes and having a small number of colors without degrading the image quality, and the information can be extracted from the image in which it has been embedded.

11 Claims, 6 Drawing Sheets

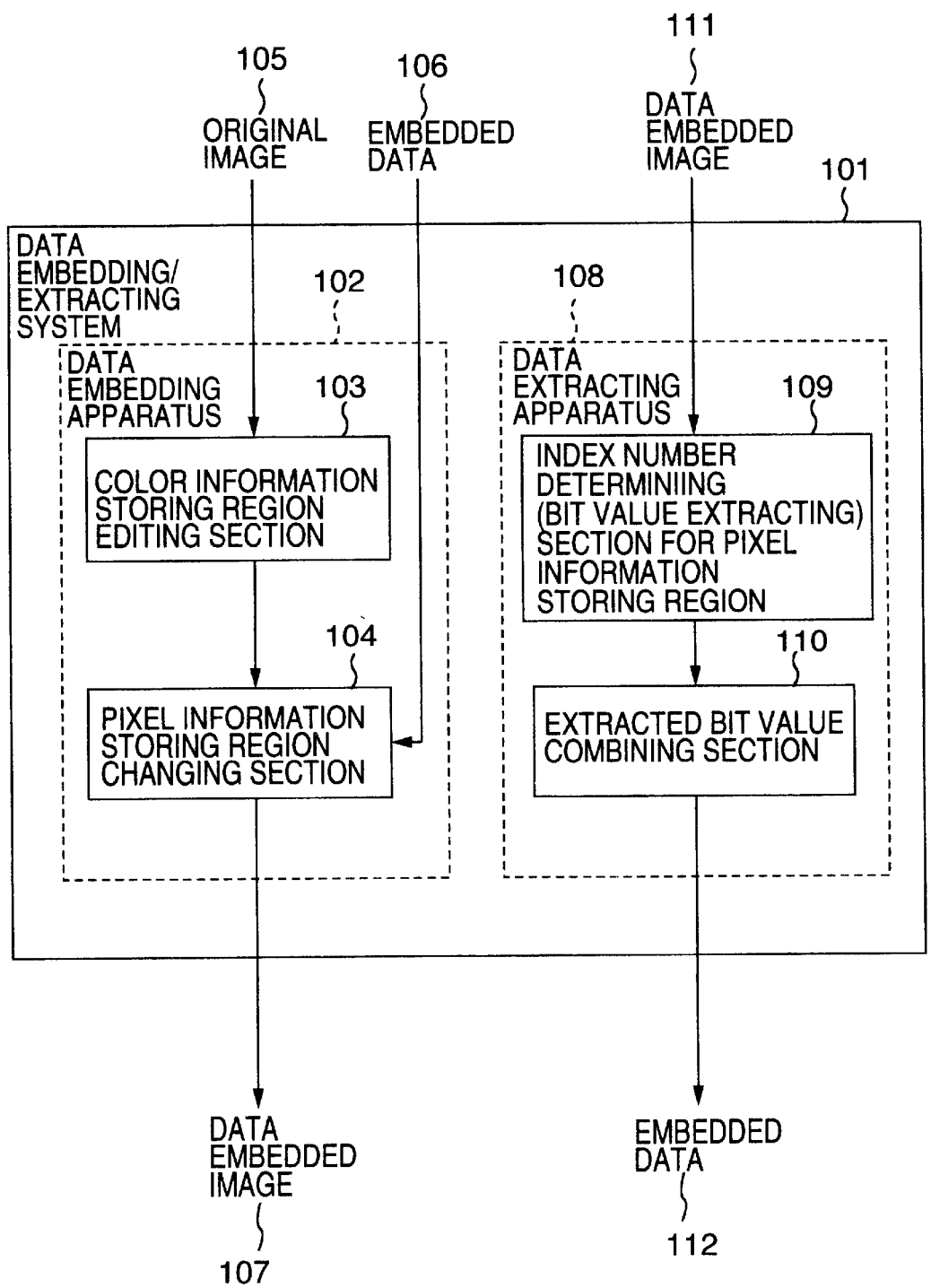

DISPLAY IMAGE

DATA STRUCTURE FOR DISPLAY IMAGE

204  < COLOR INFORMATION STORING REGION >

INDEX NUMBER: (0) ... (100) ... (255)

| COLOR INFORMATION: | (R)255 (G)255 (B)255 | ... | (R) 0 (G) 0 (B) 0 | ... | (R)128 (G)128 (B)128 |

205

< PIXEL INFORMATION STORING REGION >

| (100) | (0)   | (255) |
|-------|-------|-------|
| (255) | (100) | (0)   |
| (100) | (0)   | (100) |

206

< REGION DIVISION NUMBER STORING REGION >

207

DATA EMBEDDING APPARATUS, DATA EXTRACTING APPARATUS, AND METHOD THEREFOR, AND RECORDING MEDIUM HAVING SUCH METHODS RECORDED THEREON

BACKGROUND OF THE INVENTION

The present invention relates generally to a data embedding apparatus for embedding arbitrary information into data, an apparatus for extracting embedded data, and methods therefor, and a computer readable recording medium recording the methods, and more particularly to electronic watermark techniques for embedding information into an image.

In an electronic watermark technique applied to image data, a luminance value of pixels, a frequency component of an image, or the like is changed in such a portion in which even if data is changed, the change is not visually perceptible. Information is embedded by representing a bit value "0" or "1" or the like in the form of change in luminance value or frequency component.

Since an image embedded with information must not present any visual change therein, when compared with its original image, the conventional electronic watermark technique has the following two requirements:

1) An image into which a watermark is embedded is a digital content of a relatively large size which is composed of rather complicated shapes (or patterns) in a large number of colors, as represented by photographs, pictures and so on; and 2) A small amount of information is embedded. Conditions required to the electronic watermark techniques are described, for example, in Kobayashi et al., "Data Hiding Using the Nature of Neighboring Pixels—Statistical Nature of Neighboring Pixels", Transactions of 56th National Meeting of Institute of Information Processing, pp. 3–37 to 3–38, 1998.

SUMMARY OF THE INVENTION

When the conventional electronic watermark technique is applied to an image composed of simple shapes (or patterns) and having a small number of colors, as represented by a logo mark of a company or the like, even a small change in pixel or frequency component of the image will result in a visually perceptible degradation of the image quality. In addition, for embedding a large amount of information into an image of a relatively small size, the luminance value of pixels, frequency components of an image, or the like must be largely changed, thereby causing a significant degradation of image quality.

It is an object of the present invention to provide a data embedding apparatus, a data extracting apparatus, and methods therefor, and a recording medium having recorded thereon the methods, which are capable of embedding a large amount of information into an image of a relatively small size composed of simple shapes (or patterns) and having a small number of colors without causing any degradation of the image quality even in comparison with the original image.

To achieve the above object, the present invention comprises the following means.

It should be noted however that an image data structure intended by the present invention is assumed to have, as its components, a color information storing region for managing all colors used in an image in order of index numbers, and a pixel information storing region for indirectly specifying used colors by assigning the index number to each pixel.

First, consider that the color information storing region within the image data structure is divided into a plurality of subregions, and a corresponding bit value is defined for each of the subregions. Thus, for a color defined by a certain index number, a corresponding bit value can be identified by identifying a subregion in which the color is stored.

Next, an index number stored for each of pixels within the pixel information storing region is changed to an index number belonging to a subregion corresponding to a bit value of information to be embedded. In this way, one bit or more of information (depending on a number into which the color information storing region is divided) can be embedded for each pixel.

Also, information embedded by the foregoing means can be extracted by retrieving index numbers stored in the pixel information storing region, and identifying bit values corresponding to subregions in which the index numbers are contained.

Further, the present invention can be widely distributed on the market by programming the foregoing information embedding method into computer executable codes, and recording the codes on computer readable recording media such as magnetic disks, optical disks and so on, or through a recording medium which has recorded thereon an image that has been embedded with information by the embedding method.

BRIEF DESCRIPTION OF THE DRAWINGS

FIG. 1 is a block diagram illustrating an embodiment of a system comprising a data embedding apparatus and a data extracting apparatus for embedding and extracting data into and from an image according to the present invention;

DETAILED DESCRIPTION OF THE EMBODIMENTS

Figure 2A:
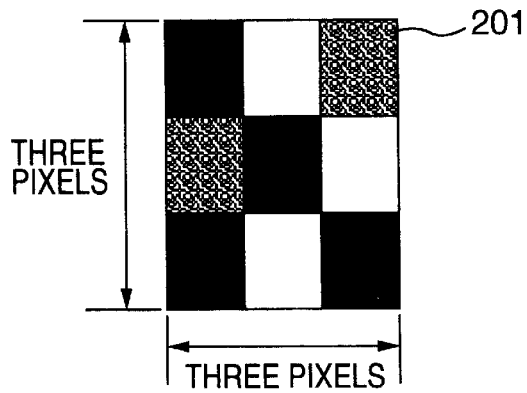
FIGS. 2A, 2B are a diagram and a table showing an example of an image data structure composed of a color information storing region, a pixel information storing region and a region division number storing region.

Embodiments of the present invention will hereinafter be described with reference to the accompanying drawings. It should be understood that the following description merely illustrates exemplary embodiments of the present invention, and is not intended to limit the present invention.

FIG. 1 illustrates in block diagram an embodiment of a system configuration according to the present invention. A data embedding/extracting system 101 according to the present invention may be implemented on an electronic computing device such as a personal computer, a workstation or the like, and is composed of a data embedding apparatus 102 comprising a data embedding method according to the present invention, and a data extracting apparatus 108.

The data embedding apparatus 102, which comprises a color information storing region editing section 103 and a pixel information storing region changing section 104, receives an original image 105 as multimedia data and an embedded data 106, and outputs a data embedded image 107.

The data extracting apparatus 108, which comprises an index number determining (bit value extracting) section 109 for a pixel information storing region, and a combining section 110 for combining extracted bit values, receives a data embedded image 111, and outputs an embedded data 112.

It should be noted that while this embodiment implements the data embedding apparatus 101 and the data extracting apparatus 102 on the same electronic computing device, the respective apparatus may be implemented on separate electronic computing devices.

Figure 2B:

FIGS. 2A, 2B show an example of an image data structure which has a color information storing region, a pixel information storing region, and a region division number storing region, which are a prerequisite for implementing the present invention.

In a display image 201 represented by three vertical pixels and three horizontal pixels (the total number of pixels are nine), an actual data structure 202 is assumed to be composed of a color information storing region 203, a pixel information storing region 206, and a region division number storing region 207.

It should be noted that the data structure may additionally store header information indicative of a variety of information on image data, and so on, separately from the color information storing region 203, the pixel information storing region 206 and the region division number storing region 207. The data structure 202 is stored in a storing section in which the data structure is stored. The color information storing region 203, the pixel information storing region 206 and the region division number storing region 207 may be stored in separate storing section from one another.

Assume that the color information storing region 203 within the data structure 202 has the capability of storing 256 colors of color information at maximum. In this event, index numbers 204 are arranged in order from (0) to (255), and color information 205 is individually stored for each index number. Here, the value of each color information is represented by a value of a total of 24 bits (zero to approximately 16,770,000 in decimal representation) composed of eight bits each of R (red), G (green) and B (blue) components. Stated another way, image data having the structure shown in the above example can utilize 256 colors within approximately 16,770,000 colors.

The pixel information storing region 206 selects a desired color for each pixel, one by one, from the color information storing region 203, and stores its index number (0–255). As shown index numbers corresponding to colors for a total of nine pixels of the display image 201 are specified in order.

The region division number storing region 207 stores a value which indicates into which subregions the color information storing region 203 is divided during the processing for embedding data into the image according to the present invention. Thus, this region may be eliminated if the division number for the color information storing region 203 is fixed.

Figure 3:
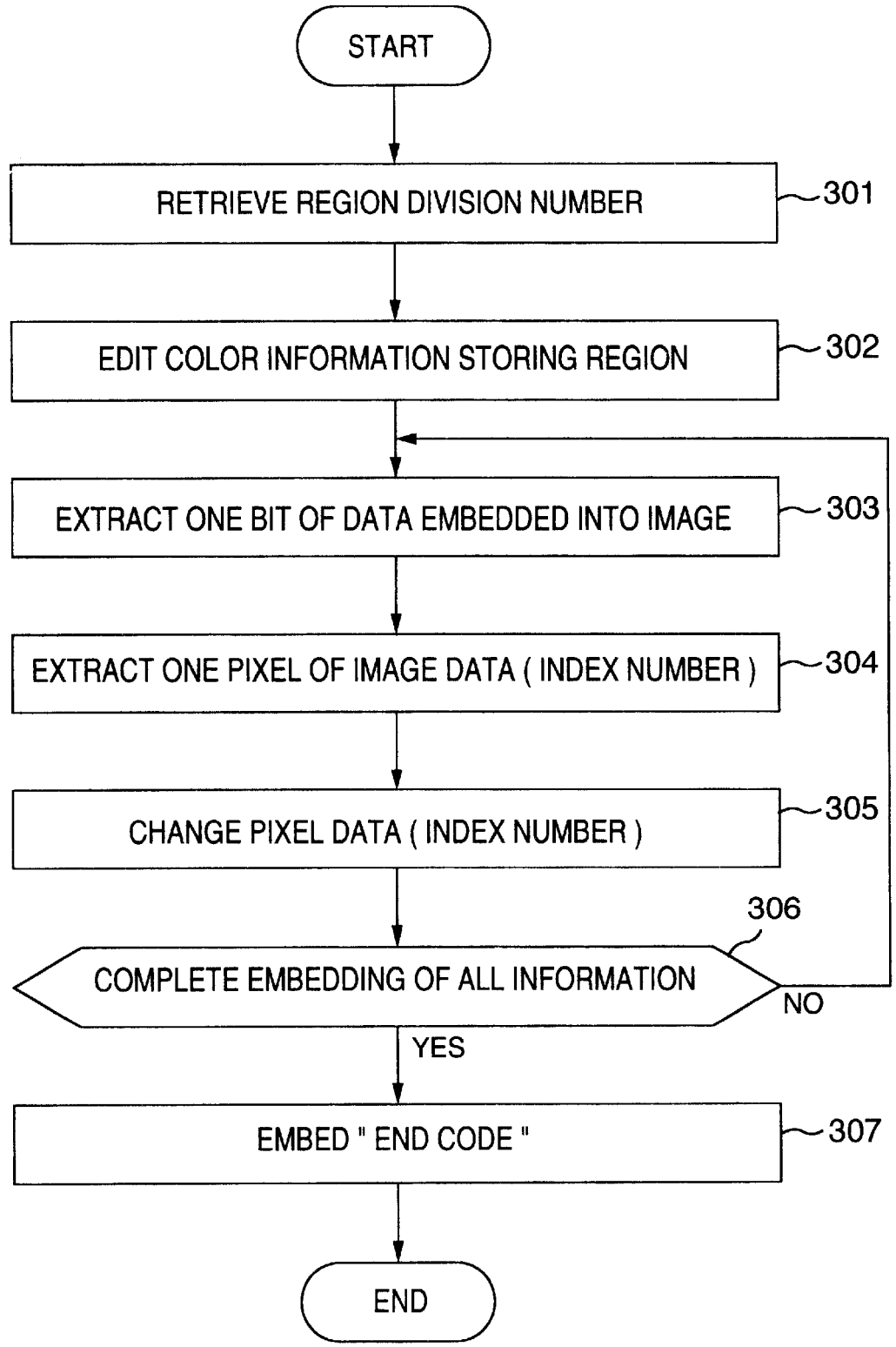
FIG. 3 is a flowchart illustrating an embodiment of a method of embedding data into an image according to the present invention.

FIG. 3 is a flow chart illustrating a method of embedding data into an image according to the present invention.

At step 301, the division number for the color information storing region 203 is retrieved from the region division number storing re ion 207. At step 302, data in the color information storing region 203 is edited to define a bit value corresponded to each subregion. At step 303, one bit of data embedded into image data is extracted. At step 304, one pixel of the image data (index number) is extracted from the pixel information storing region 206 in which the pixel data is stored.

At step 305, the image data (index number) extracted at step 304 is changed to the corresponding value defined at step 302 based on the it value extracted at step 303. At step 306, it is determined whether or not all data have been embedded. If not, step 303 through step 305 are repeated.

When all data have been embedded, an end code is embedded at step 307. The end code refers to a bit sequence used to explicitly indicate the end position of the embedded data.

Figure 4:
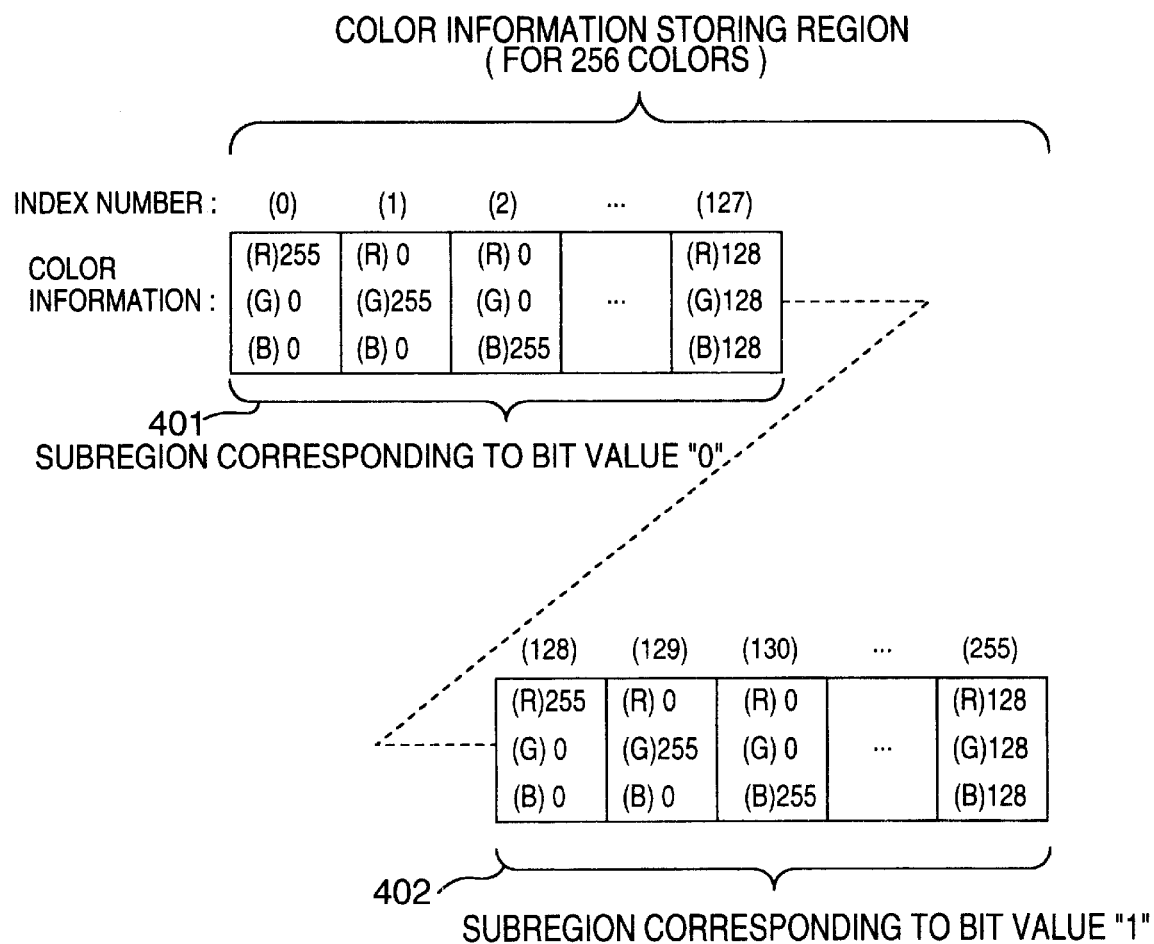
FIG. 4 is a diagram showing an embodiment of editing of the color information storing region within the image data structure.

FIG. 4 shows a specific embodiment of a procedure for editing the color information storing region 203 within the image data structure 202.

This embodiment will be described only for a particular case where the color information storing region is divided into two. As shown in FIG. 4, assume that the color information storage region for 256 colors is divided into two subregions 401, 402 each for 128 colors. It should be noted that this division does not involve any actual manipulation, modification, or the like on the image data structure itself.

In this event, the color information storing region is edited such that in the two subregions 401, 402, the values of colors and the order in which they are stored therein are identical. As shown in FIG. 4, this means that a color stored at an index number i (0·i·127) is made identical to a color stored at an index i+128. In this case, data in the subregion 401 for 128 colors may be directly duplicated to the subregion 402. However, this editing processing is not necessary if it is assumed that a color information storing region previously edited as described above has been prepared beforehand.

Here, bit values are defined in correspondence to the two divided subregions. For example, a bit value corresponding to the subregion 401 is defined to be "0"; and a bit value corresponding to the subregion 402, "1."

Figure 5:
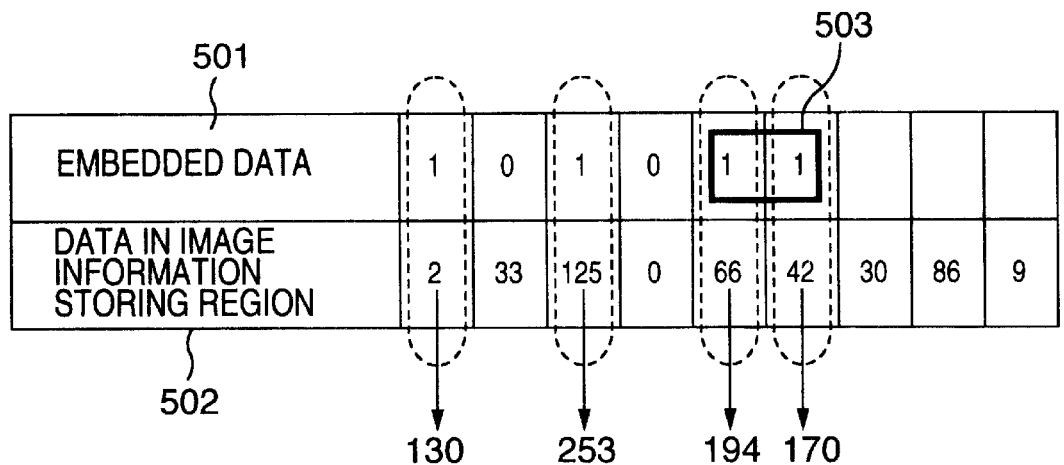
FIG. 5 is a diagram showing an embodiment for changing index numbers in the pixel information storing region within the image data structure.

FIG. 5 shows a specific embodiment of a section for changing the index number for the image information storing region in the image data structure.

With the foregoing color information storing region editing section 103, information is embedded into image data whose color information storing region is divided into two subregions. As an example, assume that 4-bit information is embedded into image data composed of three horizontal pixels and three vertical pixels (the total number of pixels is nine). Bit values of embedded data 501 is arranged in the order of "1010." Here, after embedding the information "1010," an end code 503 is added to the embedded data 501 for explicitly indicating the end position. In this embodiment, as shown, the end code 503 is defined to be "11" provisionally. It should be noted however that the end code may not be embedded if the number of embedded bits (four in this embodiment) is described in a header or the like of the image data.

Next, consider an original image into which data may be embedded.

Data 502 within a pixel information storing region of the original image specify index numbers within the color information storing region for a total of nine pixels, and with the index numbers, a color is indirectly specified for each pixel. In this event, assume that index numbers specified by the data 502 within the pixel information storing region have been all created within the subregion 401 in FIG. 4 (within the index numbers 0–127, i.e., the number of maximally available colors is 128).

Here, the embedded data 501 is compared with the data 502 within the pixel information storing region in order from the beginning. In FIG. 5, portions surrounded by broken lines indicate portions which contain the embedded data 501 having a bit value "1," and an index number of the data 502 within the pixel information storing region corresponding thereto. As previously defined, corresponding to the bit value "1" is the subregion 402 in FIG. 4. Therefore, in the data 502 within the pixel information storing region, index numbers corresponding to the bit value "1" of the embedded data 501 may be increased by 128.

For example, the first index number of the data 502 within the pixel information storing region corresponding to the bit value "1" of the embedded data 501 is two. In this case, 128 is added to two, so that the index number becomes 130 after the change. Subsequently, all index numbers corresponding to the bit value "1" of the embedded data 501 are one by one increased by 128 in a similar manner. In this way, the information is embedded into the image data by changing the index numbers of the data 502 within the pixel information storing region.

In this embodiment, it is possible to store 1-bit information per pixel. For example, when the foregoing means is applied to original image data of a relatively small size having 128 horizontal pixels and 128 vertical pixels, which can be created with a number of color not more than 128, the total number of pixels is 16,384, so that a maximum value of embedded data is 16,384 bit (2,048 bytes).

It has been previously shown that a color stored at an index number i (0·i·127) and a color stored at an index number i+128 are edited to be completely the same color in the color information storing regions divided into two subregions. Thus, even if the index numbers are changed by the aforementioned means, the image will not apparently change.

Figure 6:
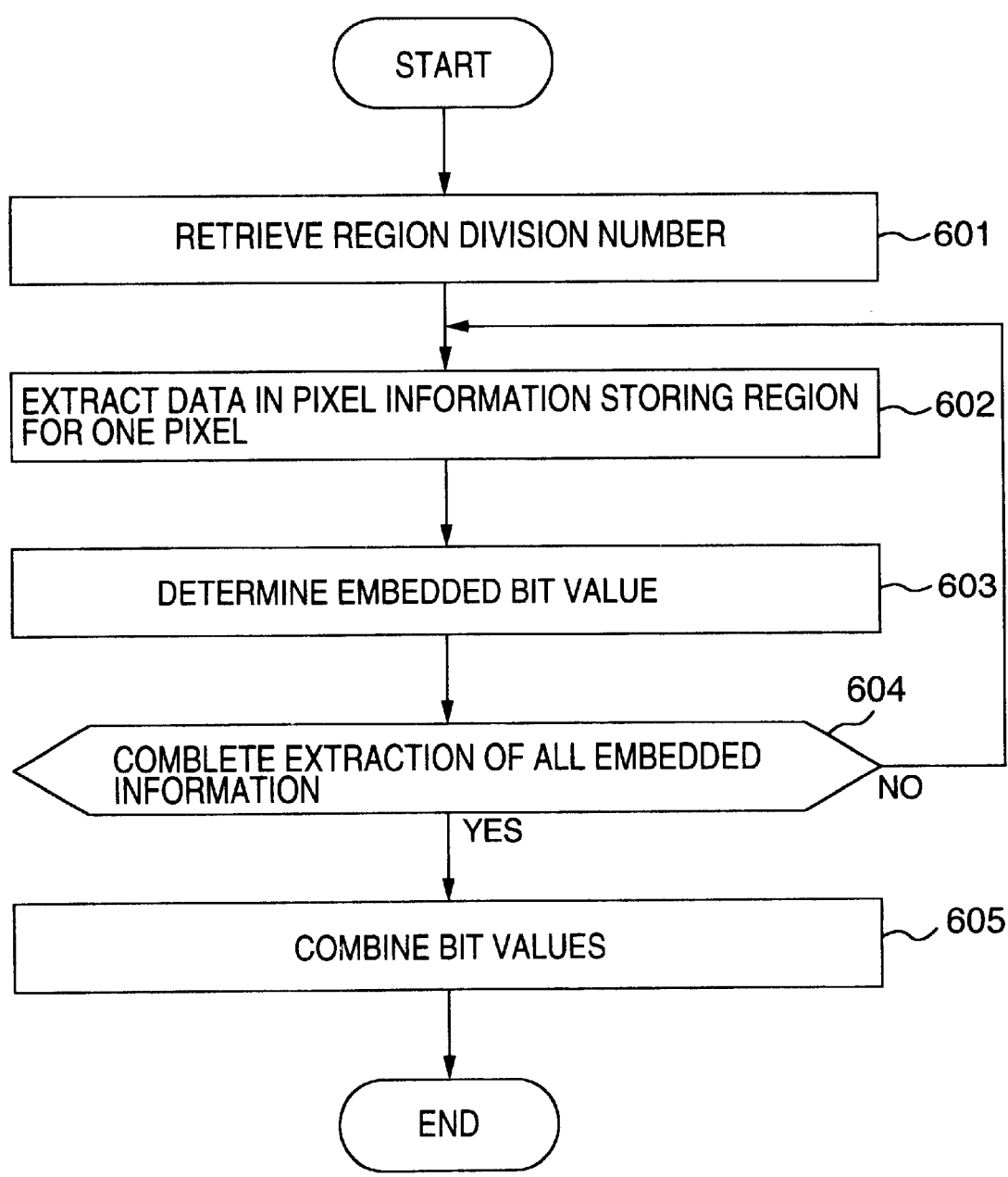
FIG. 6 is a flow chart illustrating a method of extracting data from an image according to an embodiment of the present invention.

FIG. 6 is a flow chart illustrating a method of extracting data embedded in an image.

First, at step 601, a division number for the color information storing region is retrieved from the region division number storing region. At step 602, data (index number) in the pixel information storing region is extracted for one pixel. At step 603, the extracted data is examined with respect to a bit value embedded therein. Here, when the index number extracted at step 602 is i·127, the embedded bit value is determined to be "0." Conversely, when the index number is i·128, the embedded bit value is determined to be "1."

At step 604, it is checked whether the end code appears in the extracted data. Step 602 and step 603 are repeated until the end code appears. The appearance of the end code indicates the completed retrieval of all embedded information, so that the retrieved bit values are combined at step 605. With this procedure, data produced by combining a set of finally obtained bit values (except for the end code) in order from the beginning is the embedded data in the image.

Figure 7:
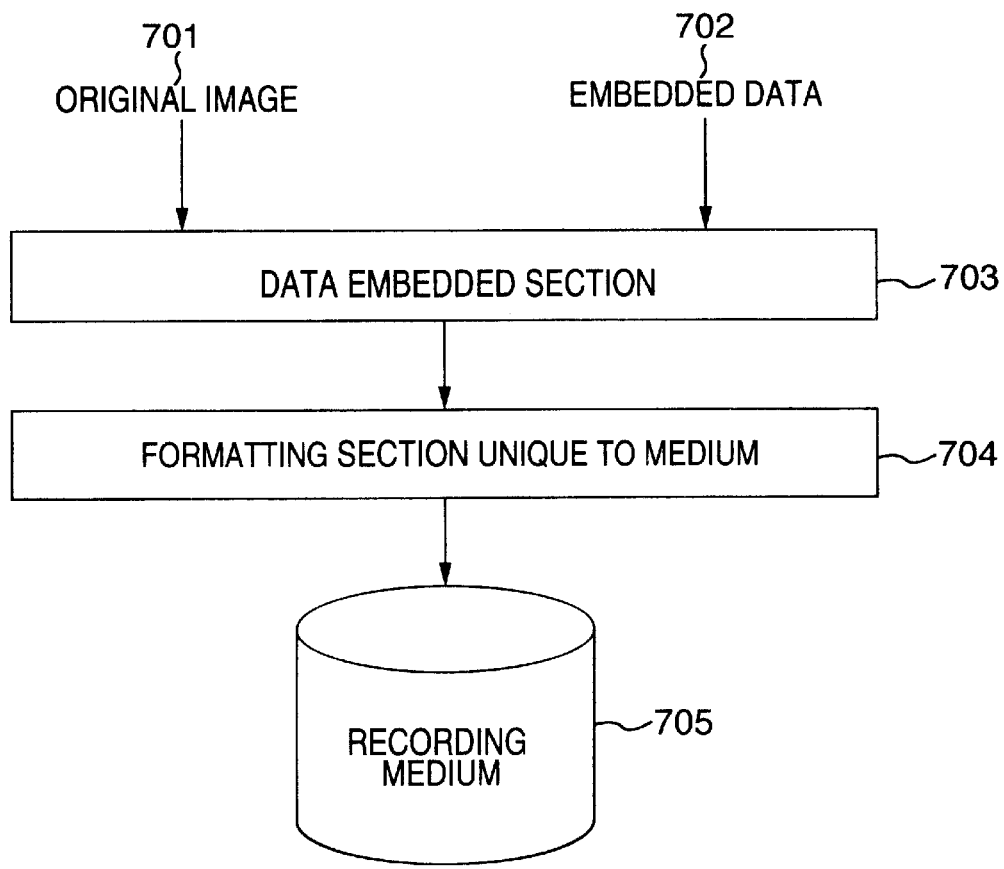
FIG. 7 is a block diagram illustrating an embodiment in which the present invention is applied to image data recorded on a recording medium.

FIG. 7 shows an example in which the present invention is applied to data which is recorded on a recording medium.

Embedded data 702 is embedded into an original image 701 by a data embedding section 703. By recording this data embedded image on a recording medium 705 formatted by a formatting section 704 unique to this medium, it is possible to create media such as magnetic disks, optical disks and so on, on which the data embedded image is recorded.

Further, the present invention may be widely distributed on the market by programming the foregoing processing for implementing the embedding method into computer executable codes, and recording the codes on computer readable recording media such as magnetic disks, optical disks and so on.

Also, while the foregoing embodiments have shown an example in which the color information storing region is edited and divided into two subregions, the color information storing region may be divided into more than two subregions, and a corresponding bit value may be defined for each of the subregions.

The present invention can embed a large amount of information into an image of a relatively small size composed of simple shapes (or patterns) and having a small number of colors, without causing a degradation in image quality, and extract the information from the image in which the information has been embedded.

What is claimed is:

1. A data embedding apparatus for embedding data into image data, having a color information storing region for storing information of colors used in an image in association with respective index numbers corresponding thereto, and a pixel information storing region for storing one of said index numbers in association with each pixel of the image, said data embedding apparatus comprising:

means for dividing said color information storing region into a plurality of subregions in which color values and the order in which the color values are stored are identical for each subregion, and for editing the color values and color value order in said color information storing region such that the respective subregions maintain mutually identical color values and color value order;

means for defining a bit value corresponding to each of said subregions; and means for selecting a color existing in said pixel information storing region corresponding to one of the bit values as embedded data, for each pixel stored in said pixel information storing region.

2. A data embedding apparatus for embedding data into image data, having a color information storing region for storing information of colors used in an image in association with respective index numbers corresponding thereto, and a pixel information storing region for storing one of said index numbers in association with each pixel of the image, said data embedding apparatus comprising:

means for dividing said color information storing region into a plurality of subregions in which color values and the order in which the color values are stored are identical for each subregion, and for editing the color values and color value order in said color information storing region such that the respective subregions maintain mutually identical color values and color value order;

means for defining a bit value corresponding to each of said subregions; and means for setting an index number corresponding to one of the bit values as embedded data, for each pixel stored in said pixel information storing region.

3. A data embedding method for embedding data into image data, in a data embedding apparatus having a color information storing region for storing information of colors used in an image in association with respective index numbers corresponding thereto, and a pixel information storing region for storing one of said index numbers in association with each pixel of the image, said data embedding method comprising the steps of:

dividing said color information storing region into a plurality of subregions in which color values and the order in which the color values are stored are identical for each subregion, and editing the color values and color value order in said color information storing region such that the respective subregions maintain mutually identical color values and color value order;

defining a bit value corresponding to each of said subregions; and selecting a color existing in said pixel information storing region corresponding to one of the bit values as embedded data, for each pixel stored in said pixel information storing region.

4. A data embedding method for embedding data into image data, in a data embedding apparatus having a color information storing region for storing information of colors used in an image in association with respective index numbers corresponding thereto, and a pixel information storing region for storing one of said index numbers in association with each pixel of the image, said data embedding method comprising the steps of:

dividing said color information storing region into a plurality of subregions in which color values and the order in which the color values are stored are identical for each subregion, and editing the color values and color value order in said color information storing region such that the respective subregions maintain mutually identical color values and color value order;

defining a bit value corresponding to each of said subregions; and setting an index number corresponding to one of the bit values as embedded data, for each pixel stored in said pixel information storing region.

5. A computer readable recording medium having recorded thereon a program for embedding data into image data, for use in a data reading apparatus having a color information storing region for storing information of colors used in an image in association with respective index numbers corresponding thereto, and a pixel information storing region for storing one of said index numbers in association with each pixel of the image, said program causing an information processing apparatus to execute the steps of:

editing said color information storing region;

of defining a bit value corresponding to each of subregions of said color information storing region; and selecting a color existing in said pixel information storing region corresponding to one of the bit values as embedded data, for each pixel stored in said pixel information storing region.

6. A recording medium having recorded thereon an image embedded with data by the data embedding method according to claim 4.

7. A data embedding/extracting system, comprising:

a data embedding apparatus for embedding data into image data, having a color information storing region for storing information of colors used in an image in association with respective index numbers corresponding thereto, and a pixel information storing region for storing one of said index numbers in association with each pixel of the image, said data embedding apparatus comprising:

means for dividing said color information storing region into a plurality of subregions in which color values and the order in which the color values are stored are identical for each subregion, and for editing the color values and color value order in said color information storing region such that the respective subregions maintain mutually identical color values and color value order;

means for defining a bit value corresponding to each of said subregions; and means for selecting a color existing in said pixel information storing region corresponding to one of the bit values as embedded data, for each pixel stored in said pixel information storing region; and a data extracting apparatus including:

means for determining in which of the plurality of subregions of the color information storing region, a color specified by each pixel of the image exists;

means for extracting the bit value corresponding to the subregion thus determined for said each pixel; and means for combining a set of the extracted bit values as data.

8. A data embedding/extracting system, comprising:

a data embedding apparatus for embedding data into image data, having a color information storing region for storing information of colors used in an image in association with respective index numbers corresponding thereto, and a pixel information storing region for storing one of said index numbers in association with each pixel of the image, said data embedding apparatus comprising:

means for dividing said color information storing region into a plurality of subregions in which color values and the order in which the color values are stored are identical for each subregion, and for editing the color values and color value order in said color information storing region such that the respective subregions maintain mutually identical color values and color value order;

means for defining a bit value corresponding to each of said subregions; and means for selecting a color existing in said pixel information storing region corresponding to one of the bit values as embedded data, for each pixel stored in said pixel information storing region; and a data extracting apparatus including:

means for determining the index number associated with each pixel of the image;

means for extracting the bit value corresponding to the index number thus determined for said each pixel; and means for combining a set of the extracted bit values as data.

9. A data embedding/extracting method, comprising the steps of:

embedding data into image data, in a data embedding apparatus having a color information storing region for storing information of colors used in an image in association with respective index numbers corresponding thereto, and a pixel information storing region for storing one of said index numbers in association with each pixel of the image, including:

dividing said color information storing region into a plurality of subregions in which color values and the order in which the color values are stored are identical for each subregion, and editing the color values and color value order in said color information storing region such that the respective subregions maintain mutually identical color values and color value order;

defining a bit value corresponding to each of said subregions; and selecting a color existing in said pixel information storing region corresponding to one of the bit values as embedded data, for each pixel stored in said pixel information storing region; and extracting the data from the image data, including:

determining in which of the plurality of subregions of the color information storing region, a color specified by each pixel of the image exists;

extracting the bit value corresponding to the subregion thus determined for said each pixel; and combining a set of the extracted bit values as data.

10. A data embedding/extracting method, comprising the steps of:

embedding data into image data, in a data embedding apparatus having a color information storing region for storing information of colors used in an image in association with respective index numbers corresponding thereto, and a pixel information storing region for storing one of said index numbers in association with each pixel of the image, including:

dividing said color information storing region into a plurality of subregions in which color values and the order in which the color values are stored are identical for each subregion, and editing the color values and color value order in said color information storing region such that the respective subregions maintain mutually identical color values and color value order;

defining a bit value corresponding to each of said subregions; and selecting a color existing in said pixel information storing region corresponding to one of the bit values as embedded data, for each pixel stored in said pixel information storing region; and extracting the data from the image data, including:

determining an index number associated with each pixel of the image;

extracting the bit value corresponding to the index number thus determined for said each pixel; and combining a set of the extracted bit values as data.

11. A computer readable recording medium having recorded thereon a program for embedding data into image data and a program for decoding data embedded in the image data by a data embedding method, for use in an information processing apparatus having a color information storing region for storing information of colors used in an image in association with respective index numbers corresponding thereto, and a pixel information storing region for storing one of said index numbers in association with each pixel of the image, said program for embedding data into image data causing the information processing apparatus to execute the steps of:

editing said color information storing region;

defining a bit value corresponding to each of subregions of said color information storing region; and selecting a color existing in said pixel information storing region corresponding to one of the bit values as embedded data, for each pixel stored in said pixel information storing region; and said program for decoding data in image data causing the information processing apparatus to execute the steps of:

determining in which of the subregions each pixel within an image body region exists;

extracting the bit value corresponding to the subregion thus determined for said each pixel; and combining a set of the extracted bit values as said data.

* * * * *